US009511862B2

(12) United States Patent
Thiele et al.

(10) Patent No.: US 9,511,862 B2
(45) Date of Patent: Dec. 6, 2016

(54) AIRCRAFT SEAT HOLDING DEVICE

(71) Applicant: RECARO Aircraft Seating GmbH & Co. KG, Schwaebisch Hall (DE)

(72) Inventors: Maik Thiele, Michelbach an der Bilz (DE); Heiko Minzer, Schwaebisch Hall (DE); Christoph Bich, Abtsgmuend (DE); Gunther Jaeger, Sulzbach-Laufen (DE); Christoph Schuerg, Schwaebisch Hall (DE)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 0 days.

(21) Appl. No.: 14/577,092

(22) Filed: Dec. 19, 2014

(65) Prior Publication Data

US 2015/0175265 A1 Jun. 25, 2015

(30) Foreign Application Priority Data

Dec. 20, 2013 (DE) .................................. 131 99 144

(51) Int. Cl.
*B64D 11/00* (2006.01)
*B64D 11/06* (2006.01)

(52) U.S. Cl.
CPC ......... *B64D 11/00152* (2014.12); *B64D 11/06* (2013.01); *B64D 11/0015* (2013.01)

(58) Field of Classification Search
CPC .............. B64D 11/00; B64D 11/0638; B64D 11/00152; B64D 11/06
USPC .............. 297/188.04, 188.07, 188.05, 217.4, 297/217.3, 146, 147, 144, 188.16, 14
See application file for complete search history.

(56) References Cited

U.S. PATENT DOCUMENTS

| | | | |
|---|---|---|---|
| 3,019,050 A | | 1/1962 | Spielman |
| 3,795,422 A | * | 3/1974 | Robinson ................. A47C 7/70 244/122 R |
| 4,460,215 A | * | 7/1984 | Chamberlain ........... A47C 9/06 297/14 |
| 4,836,602 A | | 6/1989 | d'Almada Remedios et al. |
| 5,292,174 A | | 3/1994 | Ohnuma |
| 6,059,358 A | | 5/2000 | Demick et al. |
| 6,199,948 B1 | | 3/2001 | Bush et al. |
| 6,702,375 B1 | | 3/2004 | Laskowski et al. |

(Continued)

FOREIGN PATENT DOCUMENTS

DE 93 10 641 U1 10/1993
DE 20 2006 003 018 U1 7/2006
(Continued)

OTHER PUBLICATIONS

European Search Report dated May 19, 2014 issued in corresponding EP patent application No. 13199144.0 (and partial English translation).

(Continued)

*Primary Examiner* — Milton Nelson, Jr.
(74) *Attorney, Agent, or Firm* — Posz Law Group, PLC

(57) ABSTRACT

The invention is based on an aircraft seat holding device with at least one backrest, with at least one aircraft seat carrier unit embodied by a backrest bridge and with at least one fastening unit, which is provided to fasten, in at least one operating state, at least one PED to the backrest in an exchangeable and operable manner. It is proposed that the fastening unit is at least partially integrated into the aircraft seat carrier unit embodied as a backrest bridge.

19 Claims, 3 Drawing Sheets

(56) References Cited

U.S. PATENT DOCUMENTS

Figure 1:
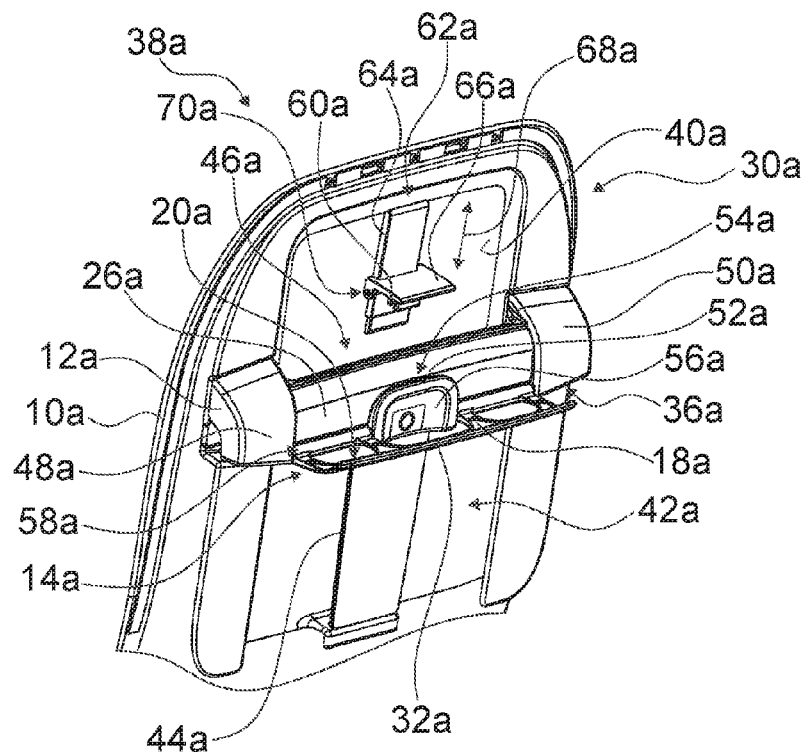

| | | |
|---|---|---|
| 7,665,804 B1 | 2/2010 | Jeffrey |
| 8,141,948 B2 | 3/2012 | Cassellia et al. |
| 2004/0145684 A1 | 7/2004 | Albert et al. |
| 2004/0239155 A1 | 12/2004 | Fourrey et al. |
| 2005/0110310 A1 | 5/2005 | Mayer et al. |
| 2006/0219857 A1 | 10/2006 | Satterfield |
| 2008/0252111 A1 | 10/2008 | Rothkop et al. |
| 2010/0213335 A1 | 8/2010 | Peng et al. |
| 2010/0244505 A1 | 9/2010 | Demick et al. |
| 2011/0278885 A1 | 11/2011 | Procter et al. |
| 2011/0316311 A1 | 12/2011 | Westerink et al. |
| 2012/0120626 A1 | 5/2012 | Akaike |
| 2012/0139303 A1 | 6/2012 | Westerink et al. |
| 2012/0162891 A1 | 6/2012 | Tranchina et al. |
| 2012/0248833 A1 | 10/2012 | Hontz et al. |
| 2013/0147240 A1* | 6/2013 | Lee .................. B60N 2/22 297/188.05 |
| 2013/0264298 A1* | 10/2013 | Shih .................. B64D 11/06 211/26 |

FOREIGN PATENT DOCUMENTS

| | | |
|---|---|---|
| DE | 10 2008 012 831 A1 | 10/2008 |
| DE | 10 2009 052 684 A1 | 7/2010 |
| DE | 10 2010 052 807 A1 | 7/2011 |
| DE | 10 2012 112 942 A1 | 6/2014 |
| DE | 10 2012 112 943 A1 | 6/2014 |
| FR | 2 954 246 A1 | 6/2011 |
| FR | 2982218 A1 * | 5/2013 ............. B60N 3/004 |
| WO | 2007/109703 A2 | 9/2007 |
| WO | 2011/143648 A2 | 11/2011 |

OTHER PUBLICATIONS

German Search Report dated Oct. 16, 2013 issued in corresponding DE patent application No. 10 2012 112 942.8 (and partial English translation).

International Search Report and Written Opinion of the International Searching Authority dated May 19, 2014 issued in corresponding international application No. PCT/EP2013/077554 (and partial English translation).

German Search Report dated Aug. 21, 2013 issued in corresponding DE patent application No. 10 2012 112 943.6 (and partial English translation).

European Search Report and Opinion dated May 21, 2014 issued in corresponding EP patent application No. 13190603.4 (and partial English translation).

Office Action dated Dec. 23, 2014 issued in corresponding U.S. Appl. No. 14/133,730.

International Preliminary Report on Patentability dated Jul. 2, 2015 issued in corresponding international patent application No. PCT/EP2013/077554 (and English translation).

Final Office Action dated May 29, 2015 issued in corresponding U.S. Appl. No. 14/133,730.

* cited by examiner

AIRCRAFT SEAT HOLDING DEVICE

CROSS REFERENCE TO RELATED APPLICATION

This application is based on and incorporates herein by reference European Patent Application No. 13199144.0 filed on Dec. 20, 2013.

PRIOR ART

The invention relates to an aircraft seat holding device according to the preamble of patent claim 1.

An aircraft seat holding device with at least one backrest, with at least one aircraft seat carrier unit embodied by a backrest bridge and with at least one fastening unit which is provided to fasten, in at least one operating state, at least one PED at the backrest in an exchangeable and operable manner, has already been proposed.

The objective of the invention is in particular to provide a generic aircraft seat holding device with improved characteristics regarding costs and a simplicity of construction. The objective is achieved according to the invention by the features of patent claim 1, while advantageous implementations and further developments of the invention may be gathered from the subclaims.

Advantages of the Invention

The invention is based on an aircraft seat holding device with at least one backrest, with at least one aircraft seat carrier unit formed by a backrest bridge and with at least one fastening unit which is provided to fasten, in at least one operating state, at least one PED at the backrest in an exchangeable and operable manner.

It is proposed that the fastening unit is at least partially integrated in the aircraft seat carrier unit embodied as a backrest bridge. Herein a "backrest" is to be understood, in particular, as a portion of an aircraft seat which supports a back of a passenger sitting on the aircraft seat. The backrest is herein oriented at least in a TTL position, substantially perpendicularly with respect to a mounting plane which the aircraft seat is mounted on, and is pivotably connected to a seat bottom of the aircraft seat. A "vehicle seat carrier unit" is to be understood, in particular, as a unit which is, in the mounted state, implemented as a carrier unit of at least one further component. A "carrier unit" is to be understood, in particular, as a unit which is, in the mounted state, provided to at least partially carry a weight force of the further component. Preferably the carrier unit is provided to deflect, in the mounted state, forces acting on the carrier unit. A "backrest bridge" is to be understood, in particular, as a unit which is provided to at least partially bridge a backrest. In particular the backrest bridge is provided to connect at least two, preferably lateral limitations of the backrest to each other. In particular the backrest bridge is arranged in an upper region of the backrest. An "upper region" of the backrest is to be understood, in particular, as a region of the backrest which, in an upright position of the aircraft seat, preferably in case of a longitudinal backrest extension that is oriented at least substantially perpendicularly to the floor, is arranged in a region of the backrest facing away from a mounting unit of the aircraft seat. In particular, the upper region of the backrest is arranged, with respect to a longitudinal backrest direction, above an amount of more than 40%, preferably more than 50% and in particular more than 55% of the longitudinal backrest extension. A "longitudinal backrest extension" is to be understood, in particular, as a main extension of the backrest, extending in an upright position of the backrest, i.e. in the TTL position, at least substantially perpendicularly with respect to the mounting plane. The longitudinal backrest extension herein runs from a first lower end of the backrest, at which the backrest is coupled with a seat bottom, to a second upper end, at which the backrest comprises a headrest. A "fastening unit" is herein intended to be understood, in particular, as a unit which is provided to fasten, in at least one operating state, a PED to the backrest in a force-fit and/or form-fit manner. The fastening unit is, for example, provided to fasten the PED, in at least one operating state, by means of a latching connection, a clamping connection and/or a connection via a hook- and loop-fastener. As an alternative, further fastening manners are conceivable that are deemed expedient by a person skilled in the art. In particular, the fastening unit is provided to fasten the PED, in at least one operating state, while avoiding a movement of the PED due to an effect of forces generated by operating the PED. By "fastening in an operable manner" it is herein to be understood that the PED is mounted at the fastening unit in such a way that it can be operated by a passenger sitting on a corresponding aircraft seat. "Provided" is to mean, in particular, specifically designed and/or equipped. By an object being provided for a certain function, it is in particular to be understood that the object fulfills and/or implements said certain function in at least one application state and/or operating state. Herein "at least partially integrated" is to mean, in particular, that at least a portion of the fastening unit, preferably however more than 50% of the fastening unit and in an especially advantageous implementation the entire fastening unit is integrated into the aircraft seat carrier unit that is embodied as a backrest bridge. A "PED" is herein to be understood, in particular, as a mobile electronic device, as in particular a tablet PC, a smartphone, an e-book reader or another mobile electronic device that is deemed expedient by the person skilled in the art. By an implementation according to the invention, the fastening unit can be integrated into the backrest particularly simply and advantageously. As a result of this, in particular a simple aircraft seat holding device can be provided.

Furthermore it is proposed that the fastening unit comprises at least one movable holding element which is connected to the aircraft seat carrier unit. Herein a "holding element" is to be understood, in particular, as an element at which further elements, e.g. in particular a PED, can be supported and thereby held. Herein a weight force is transferred from the element held via the holding element to the structure which the holding element is fastened to, as in this case in particular the aircraft seat carrier unit embodied as a backrest bridge. The "holding element being movable" is herein to be understood, in particular, in such a way that the holding element has at least two states in which it is oriented in different positions. Herein the holding element is movable by means of a support, e.g. a hinge, a linear guide or another support deemed expedient by the person skilled in the art, in defined movement tracks to the aircraft seat carrier unit. As a result of this, the fastening unit can be implemented in an especially advantageous and easily usable manner.

It is also proposed that the movable holding element is implemented as a pivotable flap. A "pivotable flap" is herein to be understood, in particular, as an element that is supported pivotably about a rotary axis with respect to a structure to which it is fastened, e.g. in this case in particular with respect to the aircraft seat carrier unit embodied as a backrest bridge. As a result of this, the holding element can be implemented in a particularly simple and advantageous manner.

Moreover it is proposed that the movable holding element comprises at least one supporting element which is provided to support a lower end of the PED. A "support element" is herein to be understood, in particular, as an element providing a supporting surface for an element that is to be mounted on the holding element, as in particular a PED, as a result of which the element may rest on the holding element in an advantageously secure manner. A "lower end of the PED" is herein to be understood, in particular, as an end of the PED which is directed downwards, in a direction of a mounting plane which the aircraft seat is mounted on. Herein the designation "lower end" does not refer to a specific end of the PED but to an end of the PED with respect to the aircraft seat. Thus the holding element can be especially advantageously implemented for a secure support of a PED.

Furthermore it is proposed that the movable holding element forms an exterior contour which, in a folded-back state, runs even with an exterior contour of the aircraft seat carrier unit. An "exterior contour of the holding element" is herein to be understood, in particular, as a contour of the holding element which delimits the holding element towards an outside, in particular in a direction facing away from the backrest. The exterior contour herein preferably forms a surface which closes the holding element in a direction of an aircraft seat arranged to the rear of the backrest, and which can be grasped by a passenger sitting on the aircraft seat. By an "exterior contour of the aircraft seat carrier unit" is herein to be understood, in particular, a contour of the aircraft seat carrier unit which delimits the aircraft seat carrier unit towards an outside, in particular in a direction facing away from the backrest. The exterior contour herein preferably forms a surface which closes the aircraft seat carrier unit in a direction of an aircraft seat arranged to the rear of the backrest, and which can be grasped by a passenger sitting on the aircraft seat. By the "exterior contours running even" it is herein to be understood, in particular, that the exterior contour of the aircraft seat carrier unit and the exterior contour of the holding element extend, in a transition between the aircraft seat carrier unit and the holding element, in one plane, and that in particular there is no ledge in the transition between the aircraft seat carrier unit and the holding element. A "folded-back state of the holding element" is herein to be understood, in particular, as a position of the holding element in which no element is held by it, and in which the holding element is arranged at and/or in the aircraft seat carrier unit in a manner that saves space in the best possible way. The folded-back state of the holding element implements a stowage position of the fastening unit. As a result of this the holding element can particularly advantageously be integrated into the aircraft seat carrier unit and, in particular, bothersome edges and ledges in an exterior contour of the backrest can be avoided.

It is further proposed that the aircraft seat carrier unit forms a pocket in which the movable holding element is arranged in a folded-back state. Thereby the holding element can be arranged in the aircraft seat carrier unit in an advantageously space-saving manner.

Furthermore it is proposed that the holding element extends only over a portion of the aircraft seat carrier unit embodied as a backrest bridge. By the "holding element extending only over a portion of the aircraft seat carrier unit embodied as a backrest bridge" it is herein to be understood, in particular, that the holding element extends, in particular in a transverse direction, only to a portion of the aircraft seat carrier unit embodied as a backrest bridge. As a result of this, the holding element can be embodied in an especially advantageously space-saving manner.

It is also proposed that the aircraft seat holding device comprises at least one receiving unit for fastening an upper end of the PED. Herein a "receiving unit" is intended to be understood, in particular, as a unit comprising at least one force-fit and/or form-fit element, by means of which the PED can be fastened to the backrest. An "upper end of the PED" is herein to be understood, in particular, as an end of the PED which faces upwards, away from the mounting plane which the aircraft seat is mounted on. Herein the designation "upper end" does respectively not refer to a specific end of the PED but refers to an end of the PED with respect to the aircraft seat. As a result of this, the PED can be fastened in the aircraft seat holding device in a particularly advantageous manner.

Furthermore it is proposed that the receiving unit is arranged, for fastening the upper end of the PED, in a region above the aircraft seat carrier unit embodied as a backrest bridge. A "region above the aircraft seat carrier unit embodied as a backrest bridge" is herein to be understood, in particular, as a region which is, if viewed from the aircraft seat carrier unit embodied as a backrest, arranged in a direction facing away from the mounting plane. The region above the aircraft seat carrier unit is herein embodied by a rear side of the backrest or a rear side of a headrest of the aircraft seat. Thereby the receiving unit can be arranged for mounting a PED in a particularly advantageous manner.

It is moreover proposed that the receiving unit is embodied as a pivotable lug. By a "pivotable lug" in particular an element is to be understood that is pivotably connected to the backrest by its first end. Herein the receiving unit embodied as a pivotable lug advantageously forms, at a second end, a form-fit element which is provided to receive the upper end of the PED. As a result of this, the receiving unit can be embodied in a particularly simple and advantageous manner.

Moreover it is proposed that the receiving unit comprises at least one supporting element which is provided to support PEDs of different sizes at the receiving unit. Herein PEDs of different sizes are advantageously supported at different lateral surfaces of the supporting element. It would basically also be conceivable that the PED is herein additionally supported at a rear side of the backrest. Thereby PEDs of different sizes can be received by the receiving unit in an advantageously simple manner.

It is also proposed that the movable holding element comprises at least one recess which extends from a connected end. As a result of this, further elements, e.g. in particular an arresting mechanism for a back-foldable eating table, can advantageously be integrated into the aircraft seat carrier unit, which elements can also be operated if the movable holding element is in a folded-back state.

It is further proposed that the aircraft seat holding device comprises at least one locking unit which fixates the movable holding element in a folded-back state. A "locking unit" is herein to be understood, in particular, as a unit which, at least in the folded-back state, exerts on the holding element at least a defined closure force, which holds the holding element in the folded-back state. Basically it is also conceivable that the locking unit is implemented by a spring-loaded element, e.g. a sphere-shaped compression piece, which is for example arranged in the holding element, protrudes over an exterior surface of the holding element and, in a folded-back state of the holding element, latches into a recess introduced in the aircraft seat carrier unit and thus fixates the holding element to the aircraft seat carrier unit. Basically it is, of course, also conceivable that an arrangement of the compression piece and the recess in the corresponding elements is the other way round. In this case, for displacing the holding element out of the folded-back state, a force would have to be exerted on the holding element, by which the spring-loaded element is deflected out of the recess and thus releases the holding element. It is basically also conceivable that the locking unit is embodied in another way that is deemed expedient by the person skilled in the art, e.g. by a latch lug or a push-push closure, e.g. a magnetic pressure latch. Thereby, in the folded-back state, an unintended moving the holding element into an opened state can be prevented.

Moreover it is proposed that the aircraft seat holding device comprises at least one spring element which, in at least one operating state, exerts a closure force on the holding element and/or on the receiving unit. A "spring element" is herein to be understood, in particular, as a spring, e.g. a helical spring, a leaf spring, a gas compression spring or a spring element made of another elastic material. As a result of this, the locking unit can be implemented in a particularly advantageous manner and, at the same time, a PED can be clamped in a state of being held in the fastening unit between the holding element and the receiving unit and can thus be arranged in the fastening unit in a particularly secure manner.

Further it is proposed that the receiving unit is adjustable in height. Herein the term "adjustable in height" is to mean that the entire receiving unit can be shifted in the longitudinal backrest extension with respect to the backrest. In this the receiving unit is preferably slidable in height at a connection point, at which the receiving unit is pivotably coupled to the backrest. To the purpose of adjusting the receiving unit in height, the fastening unit preferably comprises a linear guide to which the receiving unit is coupled. Herein the receiving unit is preferably freely slidable into any desired position in the linear guide while preferentially free of arrest. As a result of this, the fastening unit can advantageously be adapted to PEDs of different sizes and can respectively fasten these to the backrest in a secure manner.

The aircraft seat holding device according to the invention is herein not to be restricted to the application and implementation described above. In particular, the aircraft seat carrier unit according to the invention can comprise, for implementing a functionality herein described, a number of respective elements, components and units that differs from the number mentioned herein.

DRAWINGS

Further advantages may be gathered from the following description of the drawing. In the drawing two exemplary embodiments of the invention are shown. The drawing, the description and the claims contain a plurality of features in combination. The person skilled in the art will purposefully also consider the features separately and will further combine them in expedient ways.

Figure 2:
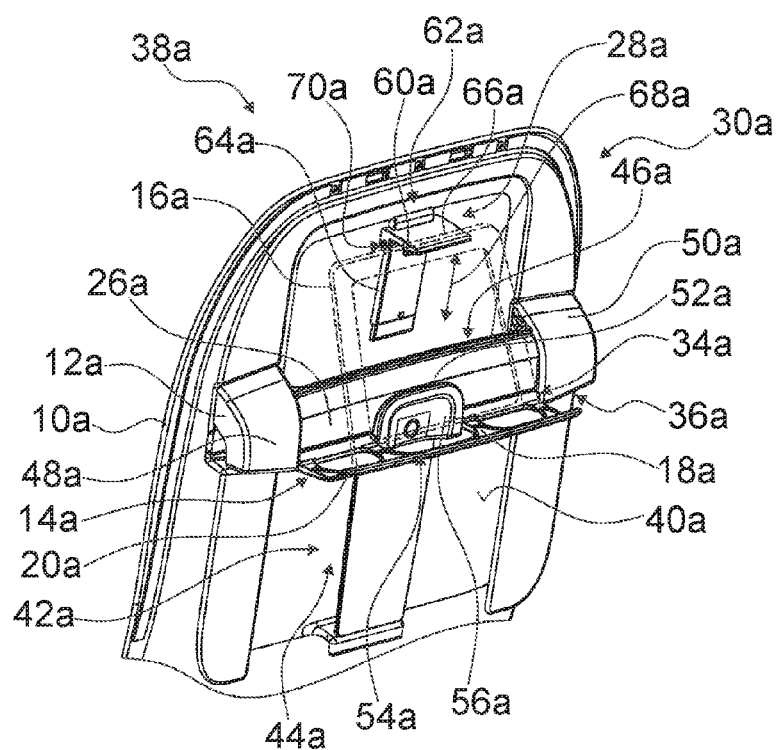
Figure 3:
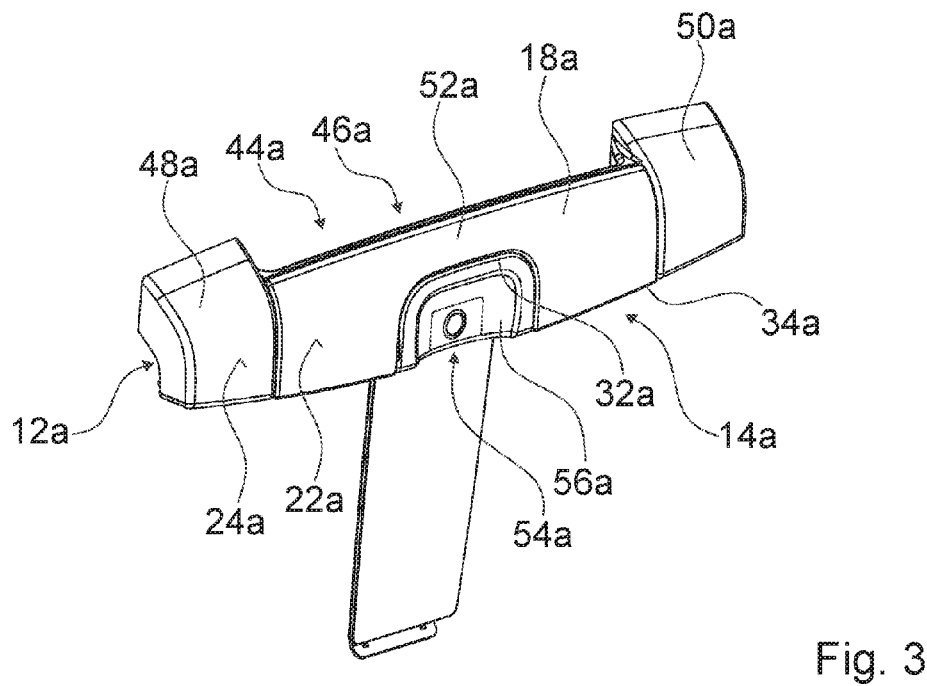
Figure 4:
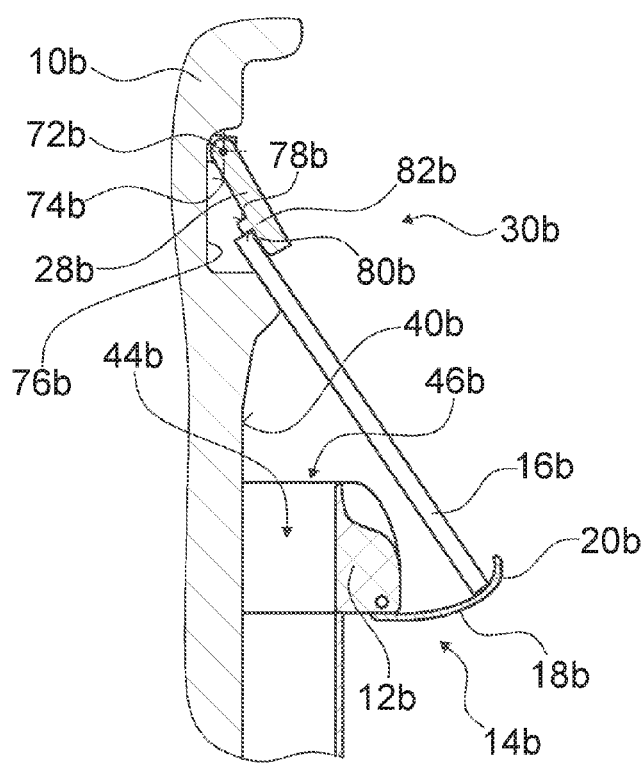
Figure 5:
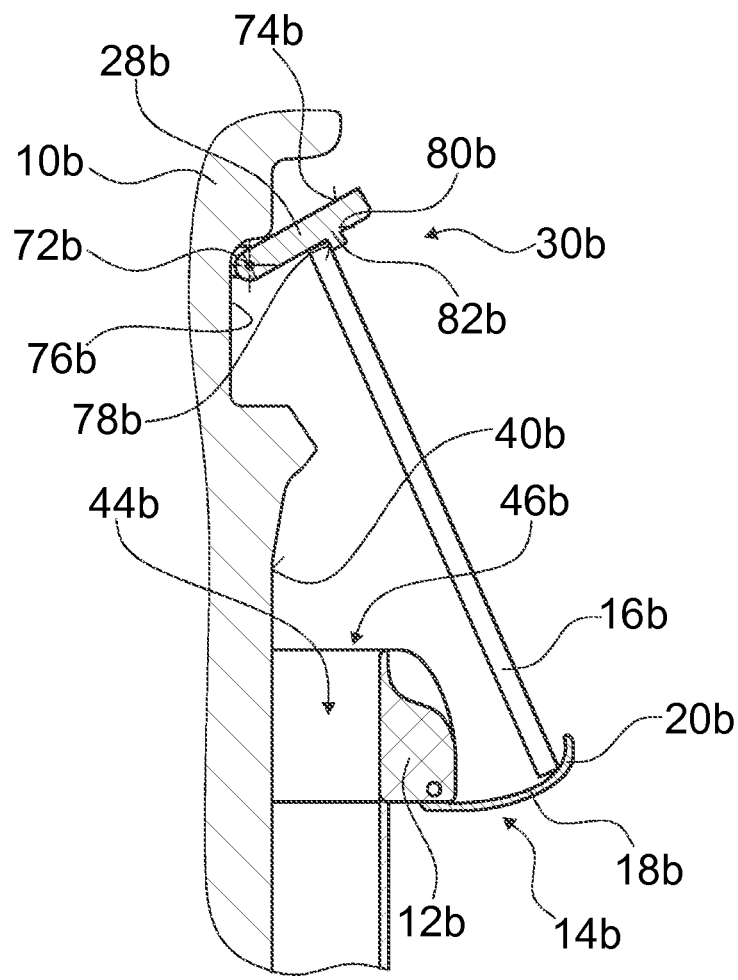

It is shown in:

FIG. 1 a schematic presentation of a portion of an aircraft seat with an aircraft seat holding device according to the invention in a first exemplary embodiment and with a fastening unit in an opened state, FIG. 2 a schematic presentation of the aircraft seat holding device with a PED arranged therein, FIG. 3 a detailed view of an aircraft seat carrier unit with the fastening unit in a folded-back state, FIG. 4 a schematic presentation of an aircraft seat holding device according to the invention in a second exemplary embodiment with a small PED arranged therein, and FIG. 5 a schematic presentation of the aircraft seat holding device according to the invention, in the second exemplary embodiment, with a large PED arranged therein.

DESCRIPTION OF THE EXEMPLARY EMBODIMENTS

FIGS. 1 to 3 show a first exemplary embodiment of an aircraft seat holding device according to the invention. The aircraft seat holding device is part of an aircraft seat 38a, which is only partially shown. The aircraft seat 38a is, in a mounted state, mounted in an aircraft that is not shown in detail. To this purpose, the aircraft seat 38a comprises a mounting unit (not shown in detail), by means of which the aircraft seat 38a is mounted on a mounting plane in the aircraft. The mounting plane is herein embodied by a cabin floor of the aircraft. Herein the aircraft seat 38a is implemented as a part of an aircraft seat row, which is not shown in detail. The aircraft seat row is herein formed by three aircraft seats 38a, which are arranged one beside the other and are embodied identically. The mounting unit is herein provided to mount all aircraft seats 38a of an aircraft seat row together. Basically it is also conceivable that the aircraft seat row comprises a different number of aircraft seats 38a or that the aircraft seat 38a is implemented as a single seat. The aircraft seat 38a comprises a seat bottom (not shown in detail), which is fastened on the mounting unit. The seat bottom forms a seat surface on which a flight passenger can sit. The aircraft seat 38a further comprises a backrest 10a. The backrest 10a is coupled with the seat bottom. The backrest 10a is herein also coupled with the mounting unit. Herein the backrest 10a is oriented in an upright position, i.e. a TTL position, perpendicularly with respect to the mounting plane. The backrest 10a is preferably coupled with the seat bottom in a pivotable manner, as a result of which different sitting positions are realizable for the flight passenger. The backrest 10a has a rear side 40a. The rear side 40a of the backrest 10a faces a further aircraft seat that is arranged to the rear of the aircraft seat 38a. The aircraft seat 38a comprises a pivotable eating table (not shown in detail), which is arranged at the rear side 40a of the backrest 10a. The pivotable eating table is arranged in a middle region 42a of the backrest 10a. The pivotable eating table is, in a non-use state, folded back to the rear side 40a of the backrest 10a. Herein the pivotable eating table, in the non-use state, abuts the rear side 40a of the backrest 10a while extending parallel to this. The aircraft seat 38a further comprises a literature pocket 44a. The literature pocket 44a is arranged in a region to the rear of the eating table, in the non-use state of the eating table. The literature pocket 44a is provided such that literature can be stored therein. In this the literature pocket 44a comprises an opening 46a, by which literature and other objects can be introduced into the literature pocket 44a. The opening 46a of the literature pocket 44a is herein arranged above the eating table in its non-use state. Thereby literature can be inserted into the literature pocket 44a, even if the eating table is folded back to the rear side 40a of the backrest 10a. It is also conceivable that the aircraft seat 38a comprises at least one armrest (not shown).

The aircraft seat holding device comprises an aircraft seat carrier unit 12a. The aircraft seat carrier unit 12a is embodied as a backrest bridge. The aircraft seat carrier unit 12a comprises a longitudinal carrier extension, which is oriented substantially parallel with respect to a plane spanned by the backrest 10a. The longitudinal carrier extension is moreover oriented substantially parallel with respect to the seat bottom. The aircraft seat carrier unit 12a is, in the mounted state, firmly connected to the backrest 10a. The aircraft seat carrier unit 12a embodied as a backrest bridge connects a lefthand side of the backrest 10a with a righthand side of the backrest 10a. Herein the aircraft seat carrier unit 12a is arranged directly above the eating table in the folded-back state. On the righthand side and on the lefthand side of the backrest 10a, the aircraft seat carrier unit 12a comprises one connection region 48a, 50a respectively, in which the aircraft seat carrier unit 12a embodied as a backrest bridge is respectively connected to the backrest 10a. Between the two connection regions 48a, 50a the aircraft seat carrier unit 12a comprises a middle region 52a. The middle region 52a is connected to the connection regions 48a, 50a. Herein the middle region 52a is preferably embodied in a one-part implementation with the connection regions 48a, 50a. The middle region 52a is herein arranged spaced apart from the rear side 40a of the backrest 10a. A space spanned between the middle region 52a of the aircraft seat carrier unit 12a and the rear side 40a of the backrest 10a forms the opening 46a of the literature pocket 44a. The aircraft seat carrier unit 12a further comprises an arresting mechanism 54a for securing the eating table in a folded-back state. The middle region 52a centrically comprises a receiving region 56a for the arresting mechanism 54a. Basically it is also conceivable that the receiving region 56a for the arresting mechanism 54a is also arranged in the middle region 52a extra-centrically. Herein the arresting mechanism 54a is not shown in detail in the drawings and is not to be explained in detail in the following, as it is sufficiently known from the state of the art.

The aircraft seat holding device further comprises a fastening unit 14a. The fastening unit 14a is provided to fasten a PED 16a to the backrest 10a in an exchangeable and operable manner. A PED 16a is herein implemented, for example, as a tablet computer or as a smartphone. The PED 16a is herein mounted to the backrest 10a by means of the fastening unit 14a in such a way that a flight passenger, who is sitting on the corresponding aircraft seat 38a that is arranged to the rear of the aircraft seat 38a with the fastening unit 14a, can operate the PED 16a in an advantageously simple manner. The fastening unit 14a is herein integrated into the aircraft seat carrier unit 12a. The fastening unit 14a comprises a movable holding element 18a. The movable holding element 18a is integrated in the aircraft seat carrier unit 12a. The movable holding element 18a has a folded-back state and an opened state. In the folded-back state the movable holding element 18a is arranged at the aircraft seat carrier unit 12a in a manner that saves space in the best possible way. In the folded-back state the PED 16a cannot be held by the holding element 18a. In the opened state the movable holding element 18a is extended and the PED 16a can be held by the holding element 18a. The movable holding element 18a is herein embodied as a pivotable flap. Herein the holding element 18a is pivotably coupled to the aircraft seat carrier unit 12a at a first, connected end 34a. At the first, connected end 34a the movable holding element 18a herein comprises a recess 32a. The recess 32a is herein centrically arranged in the movable holding element 18a. The recess 32a herein has a contour which corresponds to a contour of the receiving region 56a of the arresting mechanism 54a. In the folded-back state of the movable holding element 18a, the holding element 18a encompasses the receiving region 56a of the arresting mechanism 54a in three directions, while leaving the arresting mechanism 54a free rearwards. As a result of this, the arresting mechanism 54a can be operated by a flight passenger in the folded-back state as well as in the opened state of the holding element 18a.

For a pivotable support of the movable holding element 18a that is embodied as a pivotable flap, the fastening unit 14a comprises a hinge 58a. The hinge 58a is formed by the movable holding element 18a and the aircraft seat carrier unit 12a. A portion of the hinge 58a on the side of the holding element 18a is formed by pin elements embodied in a one-part implementation with the holding element 18a. Herein, in a region of the first, connected end 34a of the holding element 18a, at lateral surfaces facing, in the mounted state, the connection regions 48a, 50a of the aircraft seat carrier unit 12a, respectively a pin element is arranged, which extends in a direction of the connection regions 48a, 50a of the aircraft seat carrier unit 12a. On each of lateral surfaces situated inside and forming the recess 32a of the holding element 18a, also a respective pin element is arranged such that it is aligned with the other pin elements. The two pin elements that are situated inside herein extend from the respective lateral surface of the recess 32a inwards, in the mounted state in a direction of the receiving region 56a of the arresting mechanism 54a. All pin elements, which are not shown in detail in the drawings, are aligned and form the portion on the side of the holding element 18a of the hinge 58a. The portion of the hinge 58a that is formed by the aircraft seat carrier unit 12a is embodied by receiving holes into which the pins of the holding element 18a engage in a mounted state. Herein the receiving holes have been introduced into an exterior surface of the receiving region 56a of the arresting mechanism 54a and into inward-directed lateral surfaces of the connection regions 48a, 50a of the aircraft seat carrier unit 12a. Each of the receiving holes herein has a circular cross section. The receiving holes are herein arranged at a lower end of the aircraft seat carrier unit 12a, which lower end faces the eating table in a folded-back state of the eating table. The pin elements of the hinge 58a can rotate in the receiving holes, as a result of which the holding element 18a can be pivoted towards the aircraft seat carrier unit 12a. To the purpose of assembly, the holding element 18a is guided to the aircraft seat carrier unit 12a and the pins of the hinge 58a are brought into the receiving holes of the hinge 58 by applying a mounting force, without using tools. As a result of this, the holding element 18a can be mounted to the aircraft seat carrier unit 12a advantageously without using tools and simply. For disassembling the holding element 18a from the aircraft seat carrier unit 12a, a sufficiently high-level disassembling force must be exerted on the holding element 18a, such that the pin elements of the hinge 58a disengage out of the receiving holes of the hinge 58a. Thus the holding element 18a is exchangeable in a simple manner, without using tools. Basically it would herein also be conceivable that further hinges and/or elements as well as differently designed hinges may be used for connecting the holding element 18a.

The movable holding element 18a comprises a support element 20a. The support element 20a is provided to supply a support surface for the PED 16a. A lower end of the PED 16a is herein supported at the support surface of the support element 20a in a state when the PED 16a is arranged in the fastening unit 14a. The support element 20a is herein implemented as a bulge. The support element 20a is herein arranged at an interior side of the holding element 18a, which interior side, in a folded-back state of the holding element 18a, faces the backrest 10a. Basically it is also conceivable that the support element 20a is implemented differently, e.g. as a deepening. An exterior contour 22a of the holding element 18a, which faces away from the backrest 10a in a mounted state, extends in a folded-back state of the holding element 18a even with an exterior contour 24a of the aircraft seat carrier unit 12a. As a result of this, the aircraft seat carrier unit 12a forms, in a folded-back state of the holding element 18a, an even exterior contour together with the holding element 18a. Herein there are in particular no bothersome edges and height differences between the exterior contours 22a, 24a of the holding element 18a and the aircraft seat carrier unit 12a.

The aircraft seat carrier unit 12a comprises a pocket 26a, in which the movable holding element 18a is arranged in its folded-back state. The pocket 26a is herein arranged in the middle region 52a of the aircraft seat carrier unit 12a. The pocket 26a herein extends from the one connection region 48a of the aircraft seat carrier unit 12a to the other connection region 50a of the aircraft seat carrier unit 12a. The receiving region 56a of the arresting mechanism 54a is arranged in the pocket 26a of the aircraft seat carrier unit 12a. The receiving region 56a herein delimits the pocket 26a of the aircraft seat carrier unit 12a. The pocket 26a is laterally delimited by the connection regions 48a, 50a of the aircraft seat carrier unit 12a. The holding element 18a extends, in a mounted state, only over a portion of the aircraft seat carrier unit 12a embodied as a backrest bridge. The holding element 18a herein extends between the two connection regions 48a, 50a of the aircraft seat carrier unit 12a.

To the purpose of fastening an upper end of the PED 16a, the aircraft seat holding device comprises a receiving unit 28a. The receiving unit 28a is provided to fix the upper end of the PED 16a at the backrest 10a and to thus securely fasten the PED 16a in the aircraft seat holding device. Herein the receiving unit 28a is, to the purpose of fastening the upper end of the PED 16a, arranged in a region 30a above the aircraft seat carrier unit 12a embodied as a backrest bridge. The receiving unit 28a is herein implemented as a pivotable lug. At a first end the receiving unit 28a is pivotably coupled with the backrest 10a. At a second end the receiving unit 28a that is implemented as a pivotable lug comprises a form-fit element 60a. The form-fit element 60a is embodied as a hook. The form-fit element 60a that is embodied as a hook herein extends, in a mounted state, at the second front end downwards in a direction of the fastening unit 14a. The receiving unit 28a is herein adjustable in height. To this purpose, the aircraft seat holding device comprises a linear guide 62a. The linear guide 62a comprises a first guiding element 64a. The first guiding element 64a is implemented as a rail. The first guiding element 64a that is implemented as a rail is fixedly arranged at the rear side 40a of the backrest 10a. The first guiding element 64a is herein arranged in the region 30a above the aircraft seat carrier unit 12a that is embodied as a backrest bridge. The linear guide 62a comprises a second guiding element 66a. The second guiding element 66a is coupled with the first guiding element 64a that is embodied as a rail, in such a way that it is linearly slidable. The second guiding element 66a is connected to the first guiding element 64a in a form-fit manner. The second guiding element 66a is herein slidable with respect to the first slide element 64a along a slide axis 68a of the first guiding element 64a. The slide axis 68a of the first guiding element 64a is herein parallel to a longitudinal backrest extension. As a result of this, the second guiding element 66a is slidable in height with respect to the backrest 10a. The first end of the receiving unit 28a is pivotably connected to the second guiding element 66a. To this purpose, the receiving unit 28a comprises a hinge 70a, which pivotably couples the receiving unit 28a to the second guiding element 66a. By way of the receiving region 28a that is slidable in height, PEDs 16a of different sizes can be mounted at the backrest 10a in a simple manner by means of the aircraft seat holding device.

Furthermore the aircraft seat holding device comprises a locking unit 36a. The locking unit 36a is provided to fixate the movable holding element 18a in the folded-back state. The locking unit 36a holds the holding element 18a in the folded-back state by means of a closure force. To this purpose, the locking unit 36a comprises a spring element (not shown in detail). The spring element is herein integrated in the aircraft seat carrier unit 12a and is not visible from the outside. The spring element is coupled to the holding element 18a. Herein the spring element exerts a spring load on the holding element 18a, which spring load pushes the holding element 18a with its second end, at which the support element 20a is arranged, in a direction towards the backrest 10a. The spring load of the spring element herein implements the closure force of the locking unit 36a. Thereby the holding element 18a is pushed into a folded-back state by the spring element. To the purpose of moving the holding element 18a out of its folded-back state into its opened state, the holding element must be moved counter to the spring load exerted on the holding element 18a by the spring element. In a state wherein a PED 16a rests upon the holding element 18a, the closure force of the spring element pushes the PED 16a upwards. If the PED 16a is arranged in the receiving unit 28a with its upper end, the spring element clamps the PED 16a between the holding element 18a and the receiving unit 28a by way of the spring load, as a result of which the PED 16a is securely arranged at the backrest.

If a passenger wishes to mount a PED 16a at the aircraft seat holding device, first of all he has to move the holding element 18a of the fastening unit 14a out of its folded-back position counter to the closure force of the spring element. Now the passenger can lay the PED 16a with its lower end onto the support element 20a of the holding element 18a. Now the passenger can orient the receiving unit 28a in its height by means of the linear guide 62a in such a way that the receiving unit 28a can engage around the upper end of the PED 16a with its form-fit element 60a. He pivots the receiving unit 28a, which is implemented as a pivotable lug, downwards such that the upper end of the PED 16a is arranged in the form-fit element 60a of the receiving unit 28a. By means of an arrest (not shown in detail), the receiving unit 28a can be arrested in a position wherein the receiving unit 28a partially encompasses the PED 16a with its form-fit element 60a. By the closure force of the spring unit and by the arrest of the receiving unit 28a, the PED 16a is clamped between the holding element 18a and the locked receiving unit 28a, and is thus mounted in the aircraft seat holding device and thereby at the backrest 10a of the aircraft seat 38a in a manner such that it is operable and secured against falling out. Basically it is herein conceivable that regions in which the PED 16a rests upon the holding element 18a, on the receiving unit 28a and/or on the rear side 40a of the backrest 10a, are implemented particularly advantageously and smoothly for the PED 16a by means of a coating, a flocking, a pasting or by using a soft material.

In FIGS. 4 and 5 a further exemplary embodiment of the invention is shown. The following description and the drawings are essentially restricted to the differences between the two exemplary embodiments, wherein regarding components with corresponding designation, in particular regarding components with identical reference numerals, basically the drawings and/or description of the other exemplary embodiment, in particular in FIGS. 1 to 3, may be referred to. To the purpose of distinguishing the exemplary embodiments, the letter a is put after the reference numerals of the exemplary embodiment in FIGS. 1 to 3. In the exemplary embodiment of FIGS. 4 and 5 the letter a has been replaced by the letter b.

FIGS. 4 and 5 show a second exemplary embodiment of an aircraft seat holding device according to the invention. The aircraft seat holding device is part of an aircraft seat 38b, which is only partially depicted. The aircraft seat 38b comprises a backrest 10b. The backrest 10b comprises a rear side 40b. The rear side 40b of the backrest 10b faces towards a further aircraft seat, which is arranged to the rear of the aircraft seat 38b. Further the aircraft seat 38b comprises a literature pocket 44b. The literature pocket 44b is arranged in a region to the rear of the eating table in a non-use state of the eating table. Herein the literature pocket 44b comprises an opening 46b, by which literature and other objects can be inserted into the literature pocket 44b. The aircraft seat holding device comprises an aircraft seat carrier unit 12b. The aircraft seat carrier unit 12b is embodied as a backrest bridge. The aircraft seat carrier unit 12b is embodied substantially identically with the first exemplary embodiment of FIGS. 1 to 3. The aircraft seat holding device further comprises a fastening unit 14b. The fastening unit 14 b is provided to fasten a PED 16b to the backrest 10b in an exchangeable and operable manner. The fastening unit 14b comprises a movable holding element 18b. The movable holding element 18b is integrated in a middle region 52b of the aircraft seat carrier unit 12b and is implemented identically with the holding element of the first exemplary embodiment of FIGS. 1 to 3.

To the purpose of fastening an upper end of the PED 16b, the aircraft seat holding device comprises a receiving unit 28b. The receiving unit 28b is differently embodied in contrast to the first exemplary embodiment. The receiving unit 28b is implemented as a pivotable lug. Herein the receiving unit 28b is arranged at a fixed position at the backrest 10b. The receiving unit 28b is herein in particular not adjustable in height with respect to the backrest. For the connection of the receiving unit 28b at the backrest 10b, the aircraft seat holding device comprises a hinge 72b. The hinge 72b is fixedly mounted at the rear side 40b of the backrest 10b. Herein the hinge 72b and hence the receiving unit 28b are arranged in a region 30b above the aircraft seat carrier unit 12b. The hinge 72b supports the receiving unit 28b at a first, upper end which, in a mounted state, faces away from the aircraft seat carrier unit 12b. A second, lower end of the receiving unit 28b, which in a mounted state faces towards the aircraft seat carrier unit 12b, is pivotable away from the rear side 40b of the backrest 10b by means of the hinge 72b. The aircraft seat holding device comprises a spring element. The spring element is provided to exert a closure force on the receiving unit 28b. To this purpose, the spring element is integrated in the hinge 72b. The spring element is herein not shown in detail. The spring element is implemented as a helical spring. A spring load of the spring element generates a moment onto the receiving unit 28b by a coupling with the receiving unit 28b. The moment pushes the second end of the receiving unit 28b with an interior side 74b in a direction of the rear side 40b of the backrest 10b. As result of this, the receiving unit 28b is pushed into a stowage position by the spring element. The backrest 10b forms a recess 76b for receiving the receiving unit 28b. The recess 76b is introduced into the rear side 40b of the backrest 10b. Herein the receiving unit 28b is arranged in the recess 76b. In the stowage position the receiving unit 28b is entirely arranged in the recess 76b.

The receiving unit 28b comprises, to the purpose of connecting PEDs 16b of different sizes, a supporting element 82b. The supporting element 82b is provided for supporting PEDs 16b of different sizes at the receiving unit 28b. The supporting element 82b is arranged at the interior side 74b of the receiving unit 28b. The supporting element 82b is herein embodied as a bulge. The supporting element 82b that is embodied as a bulge extends away from the interior side 74b. A PED 16b can now be supported, depending on size, at a lateral surface 78b of the supporting element 82b, which is oriented in a direction of the first end of the receiving unit 28b, or at a lateral surface 80b of the supporting element 82b, which is oriented in a direction of the second end of the receiving unit 28b. Depending on a size of the PED 16b, the receiving unit 28b is pivoted farther out of its stowage position. In this the receiving unit 28b is pivoted up counter to the spring load of the spring element, as a result of which the spring element pushes on the PED 16b and thereby clamps it between the receiving unit 28b and the holding element 18b of the fastening unit 14b. In this exemplary embodiment, in which the receiving unit 28b is loaded by the spring element, a spring element exerting a spring load onto the holding element 18b of the fastening unit 14b can be dispensed with. In FIG. 4 a large PED 16b (e.g. 11 inches) is shown, which is clamped between the fastening unit 14b and the receiving unit 28b. FIG. 5 shows a smaller PED 16b (e.g. 9 inches), which is clamped between the fastening unit 14b and the receiving unit 28b. Fastening further sizes by means of further supporting elements would be conceivable.

REFERENCE NUMERALS 10a, 10b backrest
12a, 12b aircraft seat carrier unit
14a, 14b fastening unit
16a, 16b PED
18a, 18b holding element
20a, 20b support element
22a exterior contour
24a exterior contour
26a pocket
28a, 28b receiving unit
30a, 30b region
32a recess
34a connected end
36a locking unit
38a aircraft seat
40a, 40b rear side
42a middle region
44a, 44b literature pocket
46a, 46b opening
48a connection region
50a connection region
52a middle region
54a arresting mechanism
56a receiving region
58a hinge
60a form-fit element
62a linear guide
64a first guiding element
66a second guiding element
68a slide axis
70a hinge
72b hinge 74b interior side
76b recess
78b lateral surface
80b lateral surface
82b supporting element

The invention claimed is:

1. An aircraft seat holding device comprising:
at least one backrest;
at least one aircraft seat carrier unit embodied as a backrest bridge;
at least one literature pocket provided such that literature can be stored therein; and
at least one fastening unit, which is provided to fasten, in at least one operating state, at least one PED to the backrest in an exchangeable and operable manner, wherein
the fastening unit is at least partially integrated into the aircraft seat carrier unit embodied as the backrest bridge,
the backrest bridge comprises two spatially separated connection regions and a middle region,
the backrest bridge is connected to the backrest within the two spatially separated connection regions,
the middle region is arranged between the two spatially separated connection regions,
the middle region is spaced apart from the backrest, and
a space spanned between the middle region of the backrest bridge and the backrest forms an opening of the literature pocket.

2. An aircraft seat with an aircraft seat holding device according to claim 1.

3. The aircraft seat holding device according to claim 1, wherein the opening of the literature pocket is accessible when the fastening unit is in a folded-back state.

4. The aircraft seat holding device according to claim 1, wherein the fastening unit comprises at least one movable holding element, which is connected to the aircraft seat carrier unit.

5. The aircraft seat holding device according to claim 4, wherein the movable holding element forms an exterior contour which, in a folded-back state, runs even with an exterior contour of the aircraft seat carrier unit.

6. The aircraft seat holding device according to claim 4, wherein the movable holding element comprises at least one recess, which extends from a connected end.

7. The aircraft seat holding device according to claim 4, wherein at least one locking unit fixates the movable holding element in a folded-back state.

8. The aircraft seat holding device according to claim 4, wherein at least one spring element exerts, in at least one operating state, a closing force on the holding element.

9. The aircraft seat holding device according to claim 4, wherein the movable holding element is embodied as a pivotable flap.

10. The aircraft seat holding device according to claim 9, wherein the movable holding element comprises at least one support element, which is provided to support a lower end of the PED.

11. The aircraft seat holding device according to claim 1, wherein at least one receiving unit is provided for fastening an upper end of the PED.

12. The aircraft seat holding device according to claim 11, wherein, for fastening the upper end of the PED, the receiving unit is arranged in a region above the aircraft seat carrier unit embodied as the backrest bridge.

13. The aircraft seat holding device according to claim 11, wherein the receiving unit is embodied as a pivotable lug.

14. The aircraft seat holding device at least according to claim 11, wherein the receiving unit comprises at least one supporting element, which is provided to support PEDs of a variety of sizes at the receiving unit.

15. The aircraft seat holding device according to claim 11, wherein at least one spring element exerts, in at least one operating state, a closing force on the receiving unit.

16. The aircraft seat holding device according to claim 11, wherein
the fastening unit comprises a linear guide,
the linear guide is arranged at the backrest,
the receiving unit is connected to the linear guide, and
the receiving unit is linearly movably supported by the linear guide in a direction parallel to a longitudinal backrest extension.

17. An aircraft seat holding device comprising:
at least one backrest;
at least one aircraft seat carrier unit embodied as a backrest bridge, which is different from a folding tray, the backrest bridge comprises two spatially separated connection regions and a middle region, the backrest bridge is connected to the backrest within the connection regions, the middle region is arranged between the two spatially separated connection regions, the middle region is spaced apart from the backrest, and a space spanned between the middle region of the backrest bridge and the backrest forms an opening of at least one literature pocket;
at least one fastening unit, which is provided to fasten, in at least one operating state, at least one PED to the backrest in an exchangeable and operable manner;
at least one receiving unit, which is provided for fastening an upper end of the PED; and
the at least one literature pocket provided such that literature can be stored therein, wherein
the fastening unit is at least partially integrated into the aircraft seat carrier unit embodied as the backrest bridge, and
the receiving unit comprises at least one form-fit element which is pivotably supported at the backrest or pivotably and linearly movably supported at the backrest.

18. The aircraft seat holding device according to claim 17, wherein the receiving unit is a pivotable lug.

19. The aircraft seat holding device according to claim 17, wherein the fastening unit comprises at least one movable holding element, which is connected to the backrest bridge.

* * * * *